(12) United States Patent
Kimura et al.

(10) Patent No.: US 8,017,673 B2
(45) Date of Patent: Sep. 13, 2011

(54) POLYMER STABILIZER

(75) Inventors: Yoshikazu Kimura, Osaka (JP);
Tetsuya Shintaku, Sanda (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/683,325

(22) Filed: Jan. 6, 2010

(65) Prior Publication Data

US 2010/0179253 A1 Jul. 15, 2010

(30) Foreign Application Priority Data

Jan. 9, 2009 (JP) ................................. 2009-003734
Apr. 24, 2009 (JP) ................................. 2009-106164

(51) Int. Cl.
*C08K 5/07* (2006.01)
*C07H 1/00* (2006.01)
(52) U.S. Cl. ........................................ 524/58; 536/1.11
(58) Field of Classification Search ................... 524/58
See application file for complete search history.

(56) References Cited

U.S. PATENT DOCUMENTS 5,621,056 A 4/1997 Sachinvala et al.
2008/0070999 A1* 3/2008 Mager et al. .................... 521/64

FOREIGN PATENT DOCUMENTS

| AU | 644068 B2 | 12/1993 |
|---|---|---|
| CA | 2236638 A1 | 11/1998 |
| EP | 0058447 A1 | 8/1982 |
| EP | 0878502 A2 | 11/1998 |
| JP | 2006-225444 A | 8/2006 |
| JP | 2006225444 A * | 8/2006 |
| WO | WO 92/01017 A1 | 1/1992 |

OTHER PUBLICATIONS

Translation of JP 2006-225444, Aug. 2006.*
Search Report mailed May 27, 2010 in Singapore Application No. 200908734-7.
Singapore Search Report and Written Opinion issued on Sep. 7, 2010 in corresponding Singapore Patent Application No. 200908734-7.
Search Report and Written Opinion issued on Jul. 9, 2010 in Singapore Patent Application No. 200908735-4.

* cited by examiner

*Primary Examiner* — Ling-Siu Choi
*Assistant Examiner* — Hui Chin
(74) *Attorney, Agent, or Firm* — Birch, Stewart, Kolasch & Birch, LLP

(57) ABSTRACT

A polymer stabilizer comprising the following alkoxy compound:

the alkoxy compound: a compound obtained by alkoxylating at least one hydroxyl group contained in a compound of the following formula (1) containing one formyl group or carbonyl group and (n−1) hydroxyl groups in the molecule with an alkyl group having 1 to 12 carbon atoms:

$$C_nH_{2n}O_n \qquad (1)$$

(wherein, n represents an integer of 3 or more).

4 Claims, No Drawings

POLYMER STABILIZER

TECHNICAL FIELD

The present invention relates to a polymer stabilizer.

BACKGROUND ART

Various polymer stabilizers are used, for improving the processing stability of a polymer (for example, non-patent document 1).

(non-patent document 1)
Seiichi Homma, 1. Kiso Sogo Kaisetsuhen, Genba de Yakudatsu Seikei Kako Gijutsu-Zairyo to Seikei Gijutsu, PLASTIC, 2002 April edition, additional volume p. 4, published by Kogyo Chosakai Publishing, Inc.

SUMMARY OF THE INVENTION

Recently, a novel polymer stabilizer excellent in processing stability is desired.

Under such conditions, the present inventors have completed the following inventions [1] to [5].

[1] A polymer stabilizer comprising the following alkoxy compound:

the alkoxy compound: a compound obtained by alkoxylating at least one hydroxyl group contained in a compound of the following formula (1) containing one formyl group or carbonyl group and (n−1) hydroxyl groups in the molecule with an alkyl group having 1 to 12 carbon atoms:

$$C_nH_{2n}O_n \quad (1)$$

(wherein, n represents an integer of 3 or more).

[2] The polymer stabilizer according to [1], wherein the compound of the formula (1) is a monosaccharide.

[3] The polymer stabilizer according to [1] or [2], wherein the alkoxy compound is a compound of the formula (2):

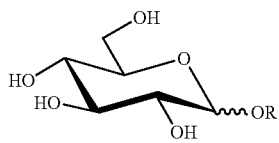

(wherein, R represents an alkyl group having 1 to 12 carbon atoms).

[4] A polymer composition comprising the polymer stabilizer as described in any one of [1] to [3] and a polymer.

[5] Use of the following alkoxy compound as a polymer stabilizer:

the alkoxy compound: a compound obtained by alkoxylating at least one hydroxyl group contained in a compound of the following formula (1) containing one formyl group or carbonyl group and (n−1) hydroxyl groups in the molecule with an alkyl group having 1 to 12 carbon atoms:

$$C_nH_{2n}O_n \quad (1)$$

(wherein, n represents an integer of 3 or more).

MODES FOR CARRYING OUT THE INVENTION

The present invention will be described in detail below.

The polymer stabilizer of the present invention comprises an alkoxy compound. Here, the alkoxy compound is a compound obtained by alkoxylating at least one hydroxyl group contained in a compound of the following formula (1) containing one formyl group or carbonyl group and (n−1) hydroxyl groups in the molecule with an alkyl group having 1 to 12 carbon atoms:

$$C_nH_{2n}O_n \quad (1)$$

In the compound (1), n represents an integer of 3 or more, preferably 3 to 60, more preferably 6 or 12.

The compound (1) has one formyl group or carbonyl group in the molecule. The compound (1) also has (n−1) hydroxyl groups.

The compound (1) is preferably a monosaccharide, and includes specifically monosaccharides having a formyl group such as glycerose, erythrose, threose, ribose, lyxose, xylose, arabinose, aldohexose, allose, talose, gulose, glucose, altrose, mannose, galactose, idose, octose and the like;

monosaccharides having a carbonyl group such as ketotriose, dihydroxyacetone, ketotetrose, erythrulose, ketopentose, xylulose, ribulose, ketohexose, psicose, fructose, sorbose, tagatose and the like; etc.

The compound (1) may be an optically active substance such as a D body, L body and the like, or an optically inactive substance such as a DL body and the like.

As the compound (1), hexoses such as allose, talose, gulose, glucose, altrose, mannose, galactose, idose, psicose, fructose, sorbose, tagatose and the like are preferable, among them, and glucose is more preferable.

The alkoxy compound is a compound obtained by alkoxylating at least one hydroxyl group contained in the compound (1) with an alkyl group. As the alkoxy compound, those having at least one hydroxyl group are preferable. It is more preferable that one hydroxyl group contained in the compound (1) is alkoxylated and the other groups are hydroxyl groups.

The above-described alkyl group has a carbon number of 1 to 12, preferably 1 or 2, more preferably 1.

Examples of the alkoxy compound include methyl α-D-glucopyranoside, methyl α-D-allopyranoside, methyl α-D-arthropyranoside, methyl α-D-mannopyranoside, methyl α-D-gulopyranoside, methyl α-D-idopyranoside, methyl α-D-galactopyranoside, methyl α-D-talopyranoside, methyl β-D-glucopyranoside, methyl β-D-allopyranoside, methyl β-D-arthropyranoside, methyl β-D-mannopyranoside, methyl β-D-gulopyranoside, methyl β-D-idopyranoside, methyl β-D-galactopyranoside, methyl β-D-talopyranoside, ethyl α-D-glucopyranoside, ethyl α-D-allopyranoside, ethyl α-D-arthropyranoside, ethyl α-D-mannopyranoside, ethyl α-D-gulopyranoside, ethyl α-D-idopyranoside, ethyl α-D-galactopyranoside, ethyl α-D-talopyranoside, ethyl β-D-glucopyranoside, ethyl β-D-allopyranoside, ethyl β-D-arthropyranoside, ethyl β-D-mannopyranoside, ethyl β-D-gulopyranoside, ethyl β-D-idopyranoside, ethyl β-D-galactopyranoside, ethyl β-D-talopyranoside, n-propyl α-D-glucopyranoside, n-propyl α-D-allopyranoside, n-propyl α-D-arthropyranoside, n-propyl α-D-mannopyranoside, n-propyl α-D-gulopyranoside, n-propyl α-D-idopyranoside, n-propyl α-D-galactopyranoside, n-propyl α-D-talopyranoside, n-propyl β-D-glucopyranoside, n-propyl β-D-allopyranoside, n-propyl β-D-arthropyranoside, n-propyl β-D-mannopyranoside, n-propyl β-D-gulopyranoside, n-propyl β-D-idopyranoside, n-propyl β-D-galactopyranoside, n-propyl β-D-talopyranoside, n-butyl α-D-glucopyranoside, n-butyl α-D-allopyranoside, n-butyl α-D-arthropyranoside, n-butyl α-D-mannopyranoside, n-butyl α-D-gulopyranoside, n-butyl α-D-idopyranoside, n-butyl α-D-galactopyranoside, n-butyl α-D- talopyranoside, n-butyl β-D-glucopyranoside, n-butyl β-D-allopyranoside, n-butyl β-D-arthropyranoside, n-butyl β-D-mannopyranoside, n-butyl β-D-gulopyranoside, n-butyl β-D-idopyranoside, n-butyl β-D-galactopyranoside, n-butyl β-D-talopyranoside, n-pentyl α-D-glucopyranoside, n-pentyl α-D-allopyranoside, n-pentyl α-D-arthropyranoside, n-pentyl α-D-mannopyranoside, n-pentyl α-D-gulopyranoside, n-pentyl α-D-idopyranoside, n-pentyl α-D-galactopyranoside, n-pentyl α-D-talopyranoside, n-pentyl β-D-glucopyranoside, n-pentyl β-D-allopyranoside, n-pentyl β-D-arthropyranoside, n-pentyl β-D-mannopyranoside, n-pentyl β-D-gulopyranoside, n-pentyl β-D-idopyranoside, n-pentyl β-D-galactopyranoside, n-pentyl β-D-talopyranoside, n-hexyl α-D-glucopyranoside, n-hexyl α-D-allopyranoside, n-hexyl α-D-arthropyranoside, n-hexyl α-D-mannopyranoside, n-hexyl α-D-gulopyranoside, n-hexyl α-D-idopyranoside, n-hexyl α-D-galactopyranoside, n-hexyl α-D-talopyranoside, n-hexyl β-D-glucopyranoside, n-hexyl β-D-allopyranoside, n-hexyl β-D-arthropyranoside, n-hexyl β-D-mannopyranoside, n-hexyl β-D-gulopyranoside, n-hexyl β-D-idopyranoside, n-hexyl β-D-galactopyranoside, n-hexyl β-D-talopyranoside, n-heptyl α-D-glucopyranoside, n-heptyl α-D-allopyranoside, n-heptyl α-D-arthropyranoside, n-heptyl α-D-mannopyranoside, n-heptyl α-D-gulopyranoside, n-heptyl α-D-idopyranoside, n-heptyl α-D-galactopyranoside, n-heptyl α-D-talopyranoside, n-heptyl β-D-glucopyranoside, n-heptyl β-D-allopyranoside, n-heptyl β-D-arthropyranoside, n-heptyl β-D-mannopyranoside, n-heptyl β-D-gulopyranoside, n-heptyl β-D-idopyranoside, n-heptyl β-D-galactopyranoside, n-heptyl β-D-talopyranoside, n-octyl α-D-glucopyranoside, n-octyl α-D-allopyranoside, n-octyl α-D-arthropyranoside, n-octyl α-D-mannopyranoside, n-octyl α-D-gulopyranoside, n-octyl α-D-idopyranoside, n-octyl α-D-galactopyranoside, n-octyl α-D-talopyranoside, n-octyl β-D-glucopyranoside, n-octyl β-D-allopyranoside, n-octyl β-D-arthropyranoside, n-octyl β-D-mannopyranoside, n-octyl β-D-gulopyranoside, n-octyl β-D-idopyranoside, n-octyl β-D-galactopyranoside, n-octyl β-D-talopyranoside, n-nonyl α-D-glucopyranoside, n-nonyl α-D-allopyranoside, n-nonyl α-D-arthropyranoside, n-nonyl α-D-mannopyranoside, n-nonyl α-D-gulopyranoside, n-nonyl α-D-idopyranoside, n-nonyl α-D-galactopyranoside, n-nonyl α-D-talopyranoside, n-nonyl β-D-glucopyranoside, n-nonyl β-D-allopyranoside, n-nonyl β-D-arthropyranoside, n-nonyl β-D-mannopyranoside, n-nonyl β-D-gulopyranoside, n-nonyl β-D-idopyranoside, n-nonyl β-D-galactopyranoside, n-nonyl β-D-talopyranoside, n-decyl α-D-glucopyranoside, n-decyl α-D-allopyranoside, n-decyl α-D-arthropyranoside, n-decyl α-D-mannopyranoside, n-decyl α-D-gulopyranoside, n-decyl α-D-idopyranoside, n-decyl α-D-galactopyranoside, n-decyl α-D-talopyranoside, n-decyl β-D-glucopyranoside, n-decyl β-D-allopyranoside, n-decyl β-D-arthropyranoside, n-decyl β-D-mannopyranoside, n-decyl β-D-gulopyranoside, n-decyl β-D-idopyranoside, n-decyl β-D-galactopyranoside, n-decyl β-D-talopyranoside, n-undecyl α-D-glucopyranoside, n-undecyl α-D-allopyranoside, n-undecyl α-D-arthropyranoside, n-undecyl α-D-mannopyranoside, n-undecyl α-D-gulopyranoside, n-undecyl α-D-idopyranoside, n-undecyl α-D-galactopyranoside, n-undecyl α-D-talopyranoside, n-undecyl β-D-glucopyranoside, n-undecyl β-D-allopyranoside, n-undecyl β-D-arthropyranoside, n-undecyl β-D-mannopyranoside, n-undecyl β-D-gulopyranoside, n-undecyl β-D-idopyranoside, n-undecyl β-D-galactopyranoside, n-undecyl β-D-talopyranoside, n-dodecyl α-D-glucopyranoside, n-dodecyl α-D-allopyranoside, n-dodecyl α-D-arthropyranoside, n-dodecyl α-D-mannopyranoside, n-dodecyl α-D-gulopyranoside, n-dodecyl α-D-idopyranoside, n-dodecyl α-D-galactopyranoside, n-dodecyl α-D-talopyranoside, n-dodecyl β-D-glucopyranoside, n-dodecyl β-D-allopyranoside, n-dodecyl β-D-arthropyranoside, n-dodecyl β-D-mannopyranoside, n-dodecyl β-D-gulopyranoside, n-dodecyl β-D-idopyranoside, n-dodecyl β-D-galactopyranoside, n-dodecyl β-D-talopyranoside and the like, and, L bodies, DL bodies and the like of the above-exemplified compounds.

As the preferable alkoxy compound, for example, compounds of the formula (2):

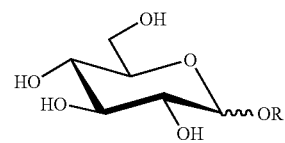

(2)

(wherein, R represents an alkyl group having a carbon number of 1 to 12, preferably 5 to 12.)
and the like are listed.

Examples of the compound of the formula (2) include
methyl α-D-glucopyranoside, methyl β-D-glucopyranoside, ethyl α-D-glucopyranoside, ethyl β-D-glucopyranoside, n-propyl α-D-glucopyranoside, n-propyl β-D-glucopyranoside, n-butyl α-D-glucopyranoside, n-butyl β-D-glucopyranoside, n-pentyl α-D-glucopyranoside, n-pentyl β-D-glucopyranoside, n-hexyl α-D-glucopyranoside, n-hexyl β-D-glucopyranoside, n-heptyl α-D-glucopyranoside, n-heptyl β-D-glucopyranoside, n-octyl α-D-glucopyranoside, n-octyl β-D-glucopyranoside, n-nonyl α-D-glucopyranoside, n-nonyl β-D-glucopyranoside, n-decyl α-D-glucopyranoside, n-decyl β-D-glucopyranoside, n-undecyl α-D-glucopyranoside, n-undecyl β-D-glucopyranoside, n-dodecyl α-D-glucopyranoside, n-dodecyl β-D-glucopyranoside, and the like.

Examples of a method for producing the alkoxy compound include a method in which a hydrogen chloride gas is allowed to pass through an alkyl alcohol solution of the compound (1) at −10° C. to room temperature, according to descriptions in SHIN JIKKEN KAGAKU KOZA 14, Yuki Kagobutsu no Gosei to Hanno V (MARUZEN CO. LTD., published on Jul. 20, 1978) p. 2426, a method in which a mixed solution of the compound (1), alkyl alcohol and hydrochloric acid is refluxed with heat to cause alkoxylation, and other methods.

Methyl α-D-glucopyranoside n-octyl β-D-glucopyranoside and the like are available from Tokyo Chemical Industry Co., Ltd.

The polymer stabilizer of the present invention may be an agent composed only of the above-described alkoxy compound, however, it may also be a blend of the alkoxy compound and additives such as an antioxidant like a phenol antioxidant, phosphorus antioxidant, sulfur antioxidant and the like; an ultraviolet absorber, photostabilizer, metal deactivator, nucleating agent, lubricant, antistatic agent, flame retardant, filler, pigment, plasticizer, anti-blocking agent, surfactant, foaming agent, emulsifier, gloss agent, neutralizing agent, binder and the like.

Examples of the phenol antioxidant include alkylated monophenols such as pentaerythritoltetrakis[3-(3,5-di-t-butyl-4-hydroxyphenyl)propionate], n-octadecyl-β-(4'hydroxy-3',5'-di-t-butylphenyl) propionate, 3,9-bis[1,1-dimethyl-2-[β-(3-t-butyl-4-hydroxy-5-methyl-phenyl) propionyloxy]ethyl]-2,4,8,10-tetraoxaspiro[5,5]-undecane, 2-[1-(2-hydroxy-3,5-di-t-pentylphenyl)ethyl]-4,6-di-t-pentylphenyl acrylate, 2-t-butyl-6-(3-t-butyl-2-hydroxy-5-methylbenzyl)-4-methylphenyl acrylate, 2,6-di-t-butyl-4-methylphenol, 2,4,6-tri-t-butylphenol, 2,6-di-t-butylphenol, 2-t-butyl-4,6-dimethylphenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-t-butyl-4-methoxymethylphenol, 2,6-di-nonyl-4-methylphenol, 2,4-dimethyl-6-(1'-methylundecyl-1'-yl)phenol, 2,4-dimethyl-6-(1'-methylheptadecyl-1'-yl)phenol, 2,4-dimethyl-6-(1'-methyltridecyl-1'-yl)phenol and mixtures thereof and the like, alkylthiomethylphenols such as 2,4-dioctylthiomethyl-6-t-butylphenol, 2,4-dioctylthiomethyl-6-ethylphenol, 2,6-didodecylthiomethyl-4-nonylphenol and mixtures thereof and the like, hydroquinones and alkylated hydroquinones such as 2,6-di-t-butyl-4-methoxyphenol, 2,5-di-t-butylhydroquinone, 2,5-di-t-amylhydroquinone, 2,6-diphenyl-4-octadecyloxyphenol, 2,6-di-t-butylhydroquinone, 2,5-di-t-butyl-4-hydroxyanisole, 3,5-di-t-butyl-4-hydroxyphenyl stearate, bis(3,5-di-t-butyl-4-hydroxyphenyl) adipate and mixtures thereof and the like, tocopherols such as α-tocopherol β-tocopherol, γ-tocopherol, δ-tocopherol and mixtures thereof and the like, hydroxylated thiodiphenyl ethers such as 2,2'-thiobis(6-t-butylphenol), 2,2'-thiobis(4-methyl-6-t-butylphenol), 2,2'-thiobis(4-octylphenol), 4,4'-thiobis(3-methyl-6-t-butylphenol), 4,4'-thiobis(2-methyl-6-t-butylphenol), 4,4'-thiobis(3,6-di-t-amylphenol), 4,4'-(2,6-dimethyl-4-hydroxyphenyl) disulfide and the like, alkylidenebisphenols such as 2,2'-methylenebis(4-methyl-6-t-butylphenol), 2,2'-methylenebis(4-ethyl-6-t-butylphenol), 2,2'-methylenebis[4-methyl-6-(α-methylcyclohexyl) phenol)], 2,2'-methylenebis(4-methyl-6-cyclohexylphenol), 2,2'-methylenebis(4-methyl-6-nonylphenol) 2,2'-methylenebis(4,6-di-t-butylphenol), 2,2'-ethylidenebis(4,6-di-t-butylphenol), 2,2'-ethylidenebis(4-isobutyl-6-t-butylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(6-t-butyl-2-methylphenol), 4,4'-methylenebis(2,6-di-t-butylphenol), 4,4'-butylidenebis(3-methyl-6-t-butylphenol), 1,1-bis(4-hydroxyphenyl)cyclohexane, 1,1-bis(5-t-butyl-4-hydroxy-2-methylphenyl)butane, 2,6-bis(3-t-butyl-5-methyl-2-hydroxybenzyl)-4-methyl-phenol, 1,1,3-tris(5-t-butyl-4-hydroxy-2-methylphenyl)butane, 1,1-bis(5-t-butyl-4-hydroxy-2-methylphenyl)-3-n-dodecylmercaptobutane, ethylene glycol bis[3,3-bis-3'-t-butyl-4'-hydroxyphenyl) butyrate], bis(3-t-butyl-4-hydroxy-5-methyl-phenyl)dicyclopentadiene, bis[2-(3'-t-butyl-2'-hydroxy-5'-methylbenzyl)-6-t-butyl-4-methylphenyl] terephthalate, 1,1-bis(3,5-dimethyl-2-hydroxyphenyl) butane, 2,2-bis(3,5-di-t-butyl-4-hydroxyphenyl)propane, 2,2-bis(5-t-butyl-4-hydroxy-2-methylphenyl)-4-n-dodecylmercaptobutane, 1,1,5,5-tetra(5-t-butyl-4-hydroxy-2-methylphenyl)pentane and mixtures thereof and the like, and derivatives thereof, O-benzyl derivatives, N-benzyl derivatives and S-benzyl derivatives such as 3,5,3',5'-tetra-t-butyl-4,4'-dihydroxydibenzyl ether, octadecyl-4-hydroxy-3,5-dimethylbenzyl mercaptoacetate, tris(3,5-di-t-butyl-4-hydroxybenzyl) amine, bis(4-t-butyl-3-hydroxy-2,6-dimethylbenzyl)dithio terephthalate, bis(3,5-di-t-butyl-4-hydroxybenzyl) sulfide, isooctyl-3,5-di-t-butyl-4-hydroxybenzyl mercaptoacetate and mixtures thereof and the like, hydroxybenzylated malonate derivatives such as dioctadecyl-2,2-bis(3,5-di-t-butyl-2-hydroxybenzyl)malonate, dioctadecyl-2-(3-t-butyl-4-hydroxy-5-methylbenzyl)malonate, didodecylmercaptoethyl-2,2-bis(3,5-di-t-butyl-4-hydroxybenzyl)malonate, bis[4-(1,1,3,3-tetramethylbutyl)phenyl]-2,2-bis(3,5-di-t-butyl-4-hydroxybenzyl)malonate and mixtures thereof and the like, aromatic hydroxybenzyl derivatives such as 1,3,5-trimethyl-2,4,6-tris(3,5-di-t-butyl-4-hydroxybenzyl)benzene, 1,4-bis(3,5-di-t-butyl-4-hydroxybenzyl)-2,3,5,6-tetramethylbenz ene, 2,4,6-tris(3,5-t-butyl-4-hydroxybenzyl)phenol and mixtures thereof and the like, triazine derivatives such as 2,4-bis(n-octylthio)-6-(4-hydroxy-3,5-di-t-butylanilino)-1,3,5-triazine, 2-n-octylthio-4,6-bis(4-hydroxy-3,5-di-t-butylanilino)-1,3,5-triazine, 2-n-octylthio-4,6-bis(4-hydroxy-3,5-di-t-butylphenoxy)-1,3,5-triazine, 2,4,6-tris(3,5-di-t-butyl-4-phenoxy)-1,3,5-triazine, tris(4-t-butyl-3-hydroxy-2,6-dimethylbenzyl) isocyanurate, tris(3,5-di-t-butyl-4-hydroxybenzyl) isocyanurate, 2,4,6-tris (3,5-di-t-butyl-4-hydroxyphenylethyl)-1,3,5-triazine, 2,4,6-tris(3,5-di-t-butyl-4-hydroxyphenylpropyl)-1,3,5-triazine, tris(3,5-dicyclohexyl-4-hydroxybenzyl) isocyanurate, tris[2-(3',5'-di-t-butyl-4'-hydroxycinnamoyloxy)ethyl]isocyanurate and mixtures thereof and the like, benzyl phosphonate derivatives such as dimethyl-3,5-di-t-butyl-4-hydroxybenzyl phosphonate, diethyl-3,5-di-t-butyl-4-hydroxybenzyl phosphonate, dioctadecyl-3,5-di-t-butyl-4-hydroxybenzyl phosphonate, dioctadecyl-5-t-butyl-4-hydroxy-3-methylbenzyl phosphonate, calcium salt of 3,5-di-t-butyl-4-hydroxybenzyl monophosphonate and mixtures thereof and the like, acylaminophenol derivatives such as 4-hydroxylauric acid anilide, 4-hydroxystearic acid anilide, octyl-N-(3,5-di-t-butyl-4-hydroxyphenyl) carbanate and mixtures thereof and the like, esters of β-(3,5-di-t-butyl-4-hydroxyphenyl)propionic acid with a monohydric alcohol or polyhydric alcohol such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl) isocyanurate, N,N'-bis(hydroxyethyl)oxamide, 3-thiaundecanol, 3 thiapentadecanol, trimethylhexanediol, trimethylolpropane, 4-hydroxymethyl-1-phospha-2,6,7-trioxabicyclo[2,2,2]octane and mixtures thereof and the like, esters of β-(3,5-dicyclohexyl-4-hydroxyphenyl)propionic acid with a monohydric alcohol or polyhydric alcohol such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl) isocyanurate, N,N'-bis(hydroxyethyl)oxamide, 3-thiaundecanol, 3 thiapentadecanol, trimethylhexanediol, trimethylolpropane, 4-hydroxymethyl-1-phospha-2,6,7-trioxabicyclo[2,2,2]octane and mixtures thereof and the like, esters of 3,5-di-t-butyl-4-hydroxyphenylacetic acid with a monohydric alcohol or polyhydric alcohol such as methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl) isocyanurate N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane and mixtures thereof and the like, amides of β-(3,5-di-t-butyl-4-hydroxyphenyl)propionic acid such as N,N'-bis[3-(3',5'-di-t-butyl-4'-hydroxyphenyl)propionyl]hydrazine, N,N'-bis[3-(3',5'-di-t-butyl-4'-hydroxyphenyl)propionyl]hexamethylenediamine, N,N'-bis[3-(3',5'-di-t-butyl-4'-hydroxyphenyl)propionyl] trimethylenediamine and mixtures thereof, and the like.

Two or more different phenol antioxidants may be used in admixture.

Particularly preferably mentioned are pentaerythritoltetrakis[3-(3,5-di-t-butyl-4-hydroxyphenyl)propionate], n-octadecyl-β-(4'hydroxy-3',5'-di-t-butylphenyl)propionate, 3,9-bis[1,1-dimethyl-2-[β-(3-t-butyl-4-hydroxy-5-methylphenyl)propionyloxy]ethyl]2,4,8,10-tetraoxaspiro[5,5]-undecane, 2-[1-(2-hydroxy-3,5-di-t-pentylphenyl)ethyl]-4,6-di-t-pentylphenyl acrylate, 2-t-butyl-6-(3-t-butyl-2-hydroxy-5-methylbenzyl)-4-methylphenyl acrylate and the like.

Examples of the phosphorus antioxidant include triphenyl phosphite, tris(nonylphenyl) phosphite, tris(2,4-di-t-butylphenyl) phosphite, 6-[3-(3-t-butyl-4-hydroxy-5-methylphenyl)propoxy]-2,4,6,8,10-tetra-t-butyldibenzo[d,f][1.3.2]dioxaphosphepin, trilauryl phosphite, trioctadecyl phosphite, distearyl pentaerythritol diphosphite, diisodecyl pentaerythritol diphosphite, bis(2,4-di-t-butylphenyl)pentaerythritol diphosphite, bis(2,4-di-t-butyl-6-methyl-phenyl) pentaerythritol diphosphite, bis(2,6-di-t-butyl-4-methylphenyl)pentaerythritol diphosphite, bis(2,4,6-tri-t-butylphenyl) pentaerythritol diphosphite, tristearyl sorbitol triphosphite, tetrakis(2,4-di-t-butylphenyl)-4,4'-diphenylene diphosphonite, 2,2'-methylenebis(4,6-di-t-butylphenyl)2-ethylhexyl phosphite, 2,2'-ethylidenebis(4,6-di-t-butylphenyl)fluorophosphite, bis(2,4-di-t-butyl-6-methyl-phenyl)ethylphosphite, bis(2,4-di-t-butyl-6-methylphenyl)methylphosphite, 2-(2,4,6-tri-t-butylphenyl)-5-ethyl-5-butyl-1,3,2-oxaphosphorinane, 2,2',2"-nitrilo[triethyltris(3,3',5,5'-tetra-t-butyl-1,1'-biphenyl-2,2'-diyl) phosphite and mixtures thereof and the like.

Two or more different phosphorus antioxidants may be used in admixture.

Particularly mentioned are tris(2,4-di-t-butylphenyl) phosphite, 6-[3-(3-t-butyl-4-hydroxy-5-methyl-phenyl)propoxy]-2,4,6,8,10-tetra-t-butyldibenzo[d,f][1.3.2]dioxaphosphepin and the like.

Examples of the sulfur antioxidant include 2,4-bis[(octylthio)methyl]-O-cresol, 4,6-bis(dodecylthiomethyl)-O-cresol, dilauryl 3,3'-thiodipropionate, tridecyl-3,3'-thiodipropionate, dimyristyl-3,3'-thiodipropionate, distearyl 3,3'-thiodipropionate, lauryl stearyl 3,3'-thiodipropionate, neopentane tetrayl tetrakis(3-laurylthio propionate) and the like.

Two or more different sulfur antioxidants may be used in admixture.

Particularly preferably, dimyristyl-3,3'-thiodipropionate is mentioned.

Examples of the ultraviolet absorber include salicylate derivatives such as phenyl salicylate, 4-t-butylphenyl salicylate, 2,4-di-t-butylphenyl-3',5'-di-t-butyl-4'-hydroxybenzoate, 4-t-octylphenyl salicylate, bis(4-t-butylbenzoyl) resorcinol, benzoyl resorcinol, hexadecyl-3',5'-di-t-butyl-4'-hydroxybenzoate, octadecyl-3',5'-di-t-butyl-4'-hydroxybenzoate, 2-methyl-4,6-di-t-butylphenyl-3',5'-di-t-butyl-4'-hydroxybenzoate and mixtures thereof and the like, 2-hydroxybenzophenone derivatives such as 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone and mixtures thereof and the like, 2-(2'-hydroxyphenyl)benzotriazoles such as 2-(2-hydroxy-5-methylphenyl)benzotriazole, 2-(3',5'-di-t-butyl-2'-hydroxyphenyl)benzotriazole, 2-(2'-hydroxy-3'-t-butyl-5'-methylphenyl)-5-chlorobenzotriazole, 2-(5'-t-butyl-2'-hydroxyphenyl)benzotriazole, 2-(2'-hydroxy-5'-t-octylphenyl)benzotriazole, 2-(3-t-butyl-2-hydroxy-5-methylphenyl)-5-chlorobenzotriazole, 2-(3'-s-butyl-2'-hydroxy-5'-t-butylphenyl)benzotriazole, 2-(2'-hydroxy-4'-octyloxyphenyl)benzotriazole, 2-(3',5'-di-t-amyl-2'-hydroxyphenyl)benzotriazole, 2-[2'-hydroxy-3',5'-bis(α,α-dimethylbenzyl)phenyl]-2H-benzotriazole, 2-[(3'-t-butyl-2'-hydroxyphenyl)-5'-(2-octyloxycarbonylethyl)phenyl]-5-chlorobenzotriazole, 2-[3'-t-butyl-5'-[2-(2-ethylhexyloxy)carbonylethyl]-2'-hydroxyphenyl]-5-chlorobenzotriazole, 2-[3'-t-butyl-2'-hydroxy-5'-(2-methoxycarbonylethyl)phenyl]-5-chlorobenzotriazole, 2-[3'-t-butyl-2'-hydroxy-5'-(2-methoxycarbonylethyl)phenyl]benzotriazole, 2-[3'-t-butyl-2'-hydroxy-5-(2-octyloxycarbonylethyl)phenyl] benzotriazole, 2-[3'-t-butyl-2'-hydroxy-5'-[2-(2-ethylhexyloxy)carbonylethyl]phenyl]benzotriazole, 2-[2-hydroxy-3-(3,4,5,6-tetrahydrophthalimidemethyl)-5-methyl-phenyl]benzotriazole, 2-(3,5-di-t-butyl-2-hydroxyphenyl)-5-chlorobenzotriazole; mixture of 2-(3'-dodecyl-2'-hydroxy-5'-methylphenyl)benzotriazole and 2-[3'-t-butyl-2'-hydroxy-5'-(2-isooctyloxycarbonylethyl) phenyl]benzotriazole; 2,2'-methylenebis[6-(2H-benzotriazol-2-yl)-4-(1,1,3,3-tetramethylbutyl)phenol, 2,2'-methylenebis[4-t-butyl-6-(2H-benzotriazol-2-yl)phenol]; condensate of poly(3 to 11) (ethylene glycol) with 2-[3'-t-butyl-2'-hydroxy-5'-(2-methoxycarbonylethyl)phenyl]benzotriazole, condensate of poly(3 to 11) (ethylene glycol) with methyl 3-[3-(2H-benzotriazol-2-yl)-5-t-butyl-4-hydroxyphenyl]propionate; 2-ethylhexyl 3-[3-t-butyl-5-(5-chloro-2H-benzotriazol-2-yl)-4-hydroxyphenyl]propionate, octyl 3-[3-t-butyl-5-(5-chloro-2H-benzotriazol-2-yl)-4-hydroxyphenyl]propionate, methyl 3-[3-t-butyl-5-(5-chloro-2H-benzotriazol-2-yl)-4-hydroxyphenyl]propionate, 3-[3-t-butyl-5-(5-chloro-2H-benzotriazol-2-yl)-4-hydroxyphenyl] propionic acid and mixtures thereof, and the like.

Two or more different ultraviolet absorbers may be used in admixture.

Particularly preferably mentioned are 2-hydroxy-4-octoxybenzophenone, 2-(2-hydroxy-5-methyl-phenyl)benzotriazole, 2-(2'-hydroxy-3'-t-butyl-5'-methylphenyl)-5-chlorobenzotriazole, 2,4-di-t-butylphenyl-3,5-di-t-butyl-4-hydroxybenzoate and the like. Such ultraviolet absorbers are used singly or in combination with another or more.

Examples of the photostabilizer include bis(2,2,6,6-tetramethyl-4-piperidyl) sebacate, bis((2,2,6,6-tetramethyl-4-piperidyl)succinate, bis(1,2,2,6,6-pentamethyl-4-piperidyl) sebacate, bis(N-octoxy-2,2,6,6-tetramethyl-4-piperidyl) sebacate, bis(N-benzyloxy-2,2,6,6-tetramethyl-4-piperidyl) sebacate, bis(N-cyclohexyloxy-2,2,6,6-tetramethyl-4-piperidyl)sebacate, bis(1,2,2,6,6-pentamethyl-4-piperidyl)2-(3,5-di-t-butyl-4-hydroxybenzyl)-2-butyl malonate, bis(1-acroyl-2,2,6,6-tetramethyl-4-piperidyl) 2,2-bis(3,5-di-t-butyl-4-hydroxybenzyl)-2-butyl malonate, bis(1,2,2,6,6-pentamethyl-4-piperidyl decane-dioate, 2,2,6,6-tetramethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl) amino-N-(2,2,6,6-tetramethyl-4-piperidyl)propionamide, tetrakis(2,2,6,6-tetramethyl-4-piperidyl)1,2,3,4-butane tetracarboxylate, tetrakis(1,2,2,6,6-pentamethyl-4-piperidyl)1,2,3,4-butane tetracarboxylate; mixed ester of 1,2,3,4-butane tetracarboxylic acid with 1,2,2,6,6-pentamethyl-4-piperidinol and 1-tridecanol, mixed ester of 1,2,3,4-butanetetracarboxylic acid with 2,2,6,6-tetramethyl-4-piperidinol and 1-tridecanol, mixed ester of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane, mixed ester of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5.5]undecane; polycondensate of dimethyl succinate with 1-(2-hydroxyethyl)-4-hydroxy-2,2,6,6-tetramethyl-piperidine; poly[(6-morpholino-1,3,5-triazine-2,4-diyl)((2,2,6,6-tetramethyl-4-piperidyl)imino) hexamethylene((2,2,6,6-tetramethyl-4-piperidyl)imino)], poly[(6-(1,1,3,3-tetramethylbutyl)imino-1,3,5-triazine-2,4-diyl((2,2,6,6-tetramethyl-4-piperidyl)imino)hexamethylene ((2,2,6,6-tetramethyl-4-piperidyl)imino)); polycondensate of N,N'-bis(2,2,6,6-tetramethyl-4-piperidyl)hexamethylenediamine with 1,2-dibromoethane; hindered amine photostabilizers such as N,N',4,7-tetrakis[4,6-bis(N-butyl-N-(2,2,6,6-tetramethyl-4-piperidyl)amino)-1,3,5-triazin-2-yl]-4,7-diazadecane-1,10-diamine, N,N',4-tris[4,6-bis(N-butyl-N-(2,2,6,6-tetramethyl-4-piperidyl)amino)-1,3,5-triazin-2-yl]-4,7-diazadecane-1,10-diamine, N,N',4,7-tetrakis[4,6-bis(N-butyl-N-(1,2,2,6,6-pentamethyl-4-piperidyl)amino-)-1,3,5-triazin-2-yl]-4,7-diazadecane-1,10-diamine, N,N',4-tris[4,6-bis(N-butyl-N-(1,2,2,6,6-pentamethyl-4-piperidyl)amino)-1,3,5-triazin-2-yl]-4,7-diazadecane-1,10-diamine and mixtures thereof and the like; acrylate photostabilizers such as ethyl α-cyano-β,β-diphenyl acrylate, isooctyl α-cyano-β,β-diphenyl acrylate, methyl α-carbomethoxy cinnamate, methyl-α-cyano-β-methyl-p-methoxy cinnamate, butyl α-cyano-β-methyl-p-methoxy cinnamate, methyl α-carbomethoxy-p-methoxy cinnamate and N-(β-carbomethoxy-β-cyanovinyl)-2-methylindoline and mixtures thereof and the like, nickel photostabilizers such as a nickel complex of 2,2'-thiobis-[4-(1,1,3,3-tetramethylbutyl)phenol], nickeldibutyldithiocarbamate, a nickel salt of a monoalkyl ester, a nickel complex of a ketoxime, and mixtures thereof and the like, oxamide photostabilizers such as 4,4'-dioctyloxyoxanilide, 2,2'-diethoxyoxanilide, 2,2'-dioctyloxy-5,5'-di-t-butylanilide, 2,2'-didodecyloxy-5,5'-di-t-butylanilide, 2-ethoxy-2-ethyloxanilide, N,N'-bis(3-dimethylaminopropyl)oxamide, 2-ethoxy-5-t-butyl-2'-ethoxyanilide, 2-ethoxy-5,4'-di-t-butyl-2'-ethyloxanilide and mixtures thereof and the like, 2-(2-hydroxyphenyl)-1,3,5-triazine photostabilizers such as 2,4,6-tris(2-hydroxy-4-octyloxyphenyl)-1,3,5-triazine, bis(2,2,6,6-tetramethyl-4-piperidyl) sebacate, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], succinic acid dimethyl-1-(2-hydroxyethyl)-4-hydroxy-2,2,6,6-tetramethylpiperidine polycondensate (Tinuvin®622), 2-(2-hydroxy-4-octyloxyphenyl)-4,6-bis(2,4-dimethylphenyl)-1,3,5-triazine, 2-[2,4-dihydroxyphenyl-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethylphenyl)-1,3,5-triazine, 2-[2-hydroxy-4-(2-hydroxy-3-octyloxypropoxy) phenyl]-4,6-bis(2,4-dimethylphenyl)-1,3,5-triazine and mixtures thereof and the like.

Two or more different photostabilizers may be used in admixture.

Particularly preferably mentioned are bis(2,2,6,6-tetramethyl-4-piperidyl) sebacate, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], succinic acid dimethyl-1-(2-hydroxyethyl)-4-hydroxy-2,2,6,6-tetramethylpiperidine polycondensate and the like.

Examples of the neutralizing agent include synthetic hydrotalcite, natural hydrotalcite, calcium hydroxide and the like.

Examples of the lubricant include paraffin, polyethylene wax, stearic acid, butyl stearate, hardened castor oil, stearyl alcohol, calcium stearate and the like.

Examples of the antistatic agent include cationic antistatic agents such as primary amine salts, tertiary amine salts, quaternary amine salts, pyridine derivatives and the like; anionic antistatic agents such as sulfated oils, soaps, sulfated ester oils, sulfated amide oils, sulfated ester salts of olefin, fatty alcohol sulfate ester salts, alkylsulfate ester salts, fatty ethyl sulfonate salts, alkylnaphthalenesulfonate salts, alkylbenzenesulfonate salts, succinate ester sulfonate salts, phosphate ester salts and the like; nonionic antistatic agents such as partial fatty esters of polyhydric alcohols, ethylene oxide adducts of fatty alcohols, ethylene oxide adducts of fatty acids, ethylene oxide adducts of fatty aminos or fatty amides, ethylene oxide adducts of alkylphenols, ethylene oxide adducts of partial fatty esters of polyhydric alcohols, polyethylene glycol and the like; ampholytic antistatic agents such as carboxylic acid derivatives, imidazoline derivatives and the like.

Example of the anti-fogging agent include stearic monoglyceride, oleic monoglyceride, polyglycerin oleate, sorbitan monolaurate, sorbitan monostearate and the like.

Mentioned as the nucleating agent are 1,3,2,4-di-benzylidene sorbitol, 1,3,2,4-di-di-(p-methylbenzylidene) sorbitol, 1,3,2,4-di-(p-ethyl-benzylidene) sorbitol, 1,3,2,4-di-(2',4'-dimethyl-benzylidene) sorbitol, 1,3-p-chlorobenzylidene-2,4-p-methyl-benzylidene sorbitol, 1,3,2,4-di-(p-propyl-benzylidene) sorbitol, aluminum-mono-hydroxy-di-p-t-butyl benzoate, sodium-bis(4-t-butylphenyl) phosphate, sodium-2,2'-methylene-bis-(4,6-di-t-butylphenyl) phosphate, talc, sodium benzoate, lithium-2,2'-methylene-bis-(4,6-di-t-butylphenyl) phosphate and the like.

Mentioned as the filler are oxides such as magnesium oxide, aluminum oxide, silicon oxide, calcium oxide, titanium oxide, chromium(III) oxide, iron oxide, zinc oxide, silica, diatomaceous earth, alumina fiber, antimony oxide, barium ferrite, strontium ferrite, beryllium oxide, pumice, pumice balloon and the like; basic substances or hydroxides such as magnesium hydroxide, aluminum hydroxide, basic magnesium carbonate and the like; carbonates such as magnesium carbonate, calcium carbonate, dolomite, dawsonite and the like; sulfates (sulfites) such as calcium sulfate, barium sulfate, ammonium sulfate, calcium sulfite, basic magnesium sulfate and the like; silicates such as sodium silicate, magnesium silicate, aluminum silicate, potassium silicate, calcium silicate, talc, clay, mica, asbestos, glass fiber, montmorillonite, glass balloon, glass bead, bentonite and the like; kaolin (potter's earth), pearlite, iron powder, copper powder, lead powder, aluminum powder, molybdenum sulfide, boron fiber, silicon carbide fiber, brass fiber, potassium titanate, lead titanate zirconate, zinc borate, aluminum borate, barium metaborate, calcium borate, sodium borate and the like.

Mentioned as the flame retardant are pentabromodiphenyl ether, octabromodiphenyl ether, decabromodiphenyl ether, tetrabromo bisphenol A, hexabromocyclododecane, triphenyl phosphate, red phosphorus, halogen-containing phosphate, aluminum hydroxide, magnesium hydroxide and the like. As an auxiliary agent for enhancing the flame retardancy of a halogen compound, antimony trioxide, antimony pentoxide and the like are listed.

As the additive to be contained in the polymer stabilizer, antioxidants are preferable and phenol antioxidants are more preferable.

Example of a method for producing the polymer stabilizer of the present invention include a method of mixing the above-described alkoxy compound and the above-described additives using a mixer such as a Banbury mixer and the like, a method of further subjecting the mixture obtained in the above-described method to granulation by extrusion granulation, stirring granulation, compression granulation and the like, and other methods.

The polymer composition of the present invention contains the above-described polymer stabilizer and a polymer.

Examples of the polymer include thermoplastic polymers, thermosetting polymers, photo-curing polymers and the like, and thermoplastic polymers are preferable. The thermoplastic polymers will be described below.

Examples of the thermoplastic polymer include polyolefins [for example, propylene resins, ethylene resins (high density polyethylene (HD-PE), low density polyethylene (LD-PE), linear low density polyethylene (LLDPE), ethylene-ethyl acrylate copolymer, ethylene-vinyl acetate copolymer, ethylene-vinyl alcohol copolymer, ethylene-methyl methacrylate copolymer and the like), cyclic polyolefins, methyl pentene polymer], polystyrenes [poly(p-methylstyrene), poly($\alpha$-methylstyrene), acrylonitrile-styrene copolymer, special acryl rubber-acrylonitrile-styrene copolymer, acrylonitrile-chlorinated polyethylene-styrene copolymer, and the like], chlorinated resins (for example, chlorinated polyethylene, polychloroprene, chlorinated rubber, polyvinyl chloride, polyvinylidene chloride), methacryl resin, fluorine resin, polyacetal, grafted polyphenylene ether resin, polyphenylene sulfide resin, polyurethane, polyamide, polyester resins (for example, polyethylene terephthalate, polybutylene terephthalate, polylactic acid and the like), polycarbonate, polyacrylate, polysulfone, polyether ether ketone, polyether sulfone, aromatic polyester resin, diallyl phthalate prepolymer, silicone resin, polyisoprene, butadiene polymer and the like. In particular, ethylene resins, propylene resins, polystyrenes and butadiene polymer are preferable, and propylene resins and butadiene polymer are more preferable.

Here, the butadiene polymer is a polymer containing a structural unit derived from butadiene, or a hydrogen-added substance of this polymer. Examples of such a butadiene polymer include styrene-butadiene copolymers such as a styrene-butadiene rubber (SBR), styrene-butadiene-styrene copolymer (SBS), styrene-butadiene block copolymer (SB) and the like, acrylonitrile-butadiene copolymer, acrylonitrile-butadiene-styrene-copolymer (ABS), polybutadiene and the like.

The butadiene polymer can be produced by a usual method such as a solution polymerization method, emulsion polymerization method, block polymerization method and the like. The butadiene polymer may be a resin or rubber. When the butadiene polymer is polybutadiene, it may be a polybutadiene rubber produced by a solution polymerization method or a polybutadiene rubber produced by an emulsion polymerization method.

Here, the propylene resin means a polyolefin containing a structural unit derived from propylene, and specifically mentioned are a crystalline propylene homopolymer, propylene-ethylene random copolymer, propylene-$\alpha$-olefin random copolymer, propylene-ethylene-$\alpha$-olefin copolymer; polypropylene block copolymer composed of a propylene homopolymer component or a copolymer component mainly composed of propylene, and a component of a copolymer of propylene and ethylene and/or $\alpha$-olefin.

In the present invention, when propylene resins are used as the thermoplastic polymer, the propylene resins may be used singly or in combination with another or more.

The $\alpha$-olefin is usually an $\alpha$-olefin having 4 to 12 carbon atoms, and examples thereof include 1-butene, 1-pentene, 1-hexene, 4-methyl-1-pentene, 1-octene, 1-decene and the like, and preferable are 1-butene, 1-hexene and 1-octene.

Examples of the propylene-$\alpha$-olefin random copolymer include a propylene-1-butene random copolymer, propylene-1-hexene random copolymer, propylene-1-octene random copolymer and the like.

Examples of the propylene-ethylene-$\alpha$-olefin copolymer include a propylene-ethylene-1-butene copolymer, propylene-ethylene-1-hexene copolymer, propylene-ethylene-1-octene copolymer and the like.

In the polypropylene block copolymer composed of a propylene homopolymer component or a copolymer component mainly composed of propylene, and a component of a copolymer of propylene and ethylene and/or $\alpha$-olefin, examples of the copolymer component mainly composed of propylene include a propylene-ethylene copolymer component, propylene-1-butene copolymer component, propylene-1-hexene copolymer component and the like, and examples of the component of a copolymer of propylene and ethylene and/or $\alpha$-olefin include a propylene-ethylene copolymer component, propylene-ethylene-1-butene copolymer component, propylene-ethylene-1-hexene copolymer component, propylene-ethylene-1-octene copolymer component, propylene-1-butene copolymer component, propylene-1-hexene copolymer component, propylene-1-octene copolymer component, and the like. In an example of the component of a copolymer of propylene and ethylene and/or $\alpha$-olefin, the content of ethylene and/or $\alpha$-olefin having 4 to 12 carbon atoms is usually 0.01 to 20 wt %.

Examples of the polypropylene block copolymer composed of a propylene homopolymer component or a copolymer component mainly composed of propylene, and a component of a copolymer of propylene and ethylene and/or $\alpha$-olefin include a propylene-ethylene block copolymer, (propylene)-(propylene-ethylene) block copolymer, (propylene)-(propylene-ethylene-1-butene) block copolymer, (propylene)-(propylene-ethylene-1-hexene) block copolymer, (propylene)-(propylene-1-butene) block copolymer, (propylene)-(propylene-1-hexene) block copolymer, (propylene-ethylene)-(propylene-ethylene-1-butene) block copolymer, (propylene-ethylene)-(propylene-ethylene-1-hexene) block copolymer, (propylene-ethylene)-(propylene-1-butene) block copolymer, (propylene-ethylene)-(propylene-1-hexene) block copolymer, (propylene-1-butene)-(propylene-ethylene) block copolymer, (propylene-1-butene)-(propylene-ethylene-1-butene) block copolymer, (propylene-1-butene)-(propylene-ethylene-1-hexene) block copolymer, (propylene-1-butene)-(propylene-1-butene) block copolymer, (propylene-1-butene)-(propylene-1-hexene) block copolymer, and the like.

When a propylene resin is used as the thermoplastic polymer in the present invention, preferable are polypropylene block copolymers composed of a crystalline propylene homopolymer, propylene homopolymer component or a copolymer component mainly composed of propylene, and a component of a copolymer of propylene and ethylene and/or α-olefin having 4 to 12 carbon atoms. More preferable are polypropylene block copolymers composed of a propylene homopolymer component or a copolymer component mainly composed of propylene, and a component of a copolymer of propylene and ethylene and/or α-olefin having 4 to 12 carbon atoms.

Regarding the method for producing the polymer composition of the present invention, examples of the case of production of a thermoplastic polymer composition include a method in which the above-described polymer stabilizer and thermoplastic polymer are mixed, then, melt-kneaded by a single-screw or multi-screw extruder, a method in which the above-described polymer stabilizer is previously dissolved or suspended in a solvent and the resultant solution is fed to a solution after polymerization of a thermoplastic polymer, then, the solvent is removed by a process such as evaporation, distillation and the like, and other methods.

When the polymer stabilizer is composed only of an alkoxy compound in the method for producing the polymer composition of the present invention, a method in which additives are blended separately from the polymer stabilizer is also exemplified. Specifically, a method in which pellets of an alkoxy compound, additives and thermoplastic polymer are mixed by a Banbury mixer and the like, then, extrusion-molded to obtain a polymer composition in the form of pellet, and other methods, are mentioned.

Thus obtained polymer composition can be further molded to obtain a product such as a film, molding material, pipe and the like.

The polymer stabilizer in the polymer composition of the present invention is usually compounded so that the amount of an alkoxy compound contained in the polymer stabilizer is 0.0005 to 5 parts by weight, preferably 0.001 to 3 parts by weight with respect to 100 parts by weight of the polymer.

The polymer composition containing the polymer stabilizer of the present invention is excellent in processing stability.

EXAMPLES

The present invention will be described further in detail by examples below.

Example 1

To 100 parts by weight a styrene-butadiene block copolymer (Asaflex 830 manufactured by Asahi Kasei Corporation) was mixed 0.24 parts by weight of methyl α-D-glucopyranoside (Tokyo Chemical Industry Co., Ltd.) as a polymer stabilizer, and the mixture was kneaded using Laboplasto-Mill (4C-150) manufactured by Toyo Seiki Co., Ltd. under conditions of 250° C. and a revolution of 100 rpm in a nitrogen atmosphere, to obtain a polymer composition of the present invention.

(Evaluation of Processing Stability)

The kneading in Example 1 was continued, and the time until reaching the maximum torque value of the Laboplasto-Mill was measured as a build up time. The polymer composition in Example 1 showed a build up time of 74 minutes. In the case of the styrene-butadiene block copolymer, a longer build up time means more excellent processing stability, thus, it is understood that the polymer composition of methyl α-D-glucopyranoside and styrene-butadiene block copolymer has excellent processing stability.

Example 2

The same procedure as in Example 1 was carried out excepting that methyl α-D-glucopyranoside in Example 1 was changed to n-octyl β-D-glucopyranoside. The resultant polymer composition had a build up time of 111 minutes, showing excellent processing stability.

Comparative Example 1

The same procedure as in Example 1 was carried out excepting that the polymer stabilizer was not used, and the build up time was measured to find a value of 42 minutes.

INDUSTRIAL APPLICABILITY

The polymer composition containing the polymer stabilizer of the present invention is excellent in processing stability, particularly, excellent in processing stability under high temperatures at which molding processing is carried out.

The invention claimed is:

1. A polymer stabilizer comprising the following alkoxy compound:
   the alkoxy compound: a compound obtained by alkoxylating at least one hydroxyl group contained in a compound of the following formula (1) containing one formyl group or carbonyl group and (n−1) hydroxyl groups in the molecule with an alkyl group having 1 to 12 carbon atoms:

$$C_nH_{2n}O_n \tag{1}$$

wherein, n represents an integer of 3 or more; and
   wherein the polymer is butadiene polymer.

2. The polymer stabilizer according to claim 1, wherein the compound of the formula (1) is a monosaccharide.

3. The polymer stabilizer according to claim 1, wherein the alkoxy compound is a compound of the formula (2):

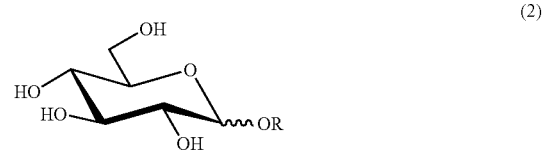

wherein, R represents an alkyl group having 1 to 12 carbon atoms.

4. A polymer composition comprising the polymer stabilizer as described in claim 1 and a polymer.

* * * * *